US007406913B2

(12) United States Patent
Chung

(10) Patent No.: US 7,406,913 B2
(45) Date of Patent: Aug. 5, 2008

(54) COFFEE BEAN ROASTER AND METHOD FOR ROASTING COFFEE BEANS USING THE SAME

(75) Inventor: David Chung, Gyeonggi-Do (KR)

(73) Assignee: HRS Co. Ltd., Seoul (KR)

( * ) Notice: Subject to any disclaimer, the term of this patent is extended or adjusted under 35 U.S.C. 154(b) by 699 days.

(21) Appl. No.: 10/970,232

(22) Filed: Oct. 20, 2004

(65) Prior Publication Data

US 2005/0226976 A1 Oct. 13, 2005

(30) Foreign Application Priority Data

Apr. 12, 2004 (KR) .................. 10-2004-0025019

(51) Int. Cl.
*A23N 12/10* (2006.01)
(52) U.S. Cl. .................. 99/286; 99/421 R; 99/451; 99/443 R; 99/479; 221/150 A; 219/389
(58) Field of Classification Search .................. 426/505, 426/466; 99/421 R, 451, DIG. 14, 479; 219/389, 219/752, 762; 221/150 A; 34/126
See application file for complete search history.

(56) References Cited

U.S. PATENT DOCUMENTS

| 1,747,239 | A | * | 2/1930 | Hauck ..................... 99/323.9 |
| 1,764,872 | A | * | 6/1930 | Idonas et al. ................ 34/127 |
| 1,880,822 | A | * | 10/1932 | Cook et al. ................ 219/389 |
| 2,705,450 | A | * | 4/1955 | Steinbook .................... 99/340 |
| 2,897,602 | A | * | 8/1959 | Hines et al. .................... 34/63 |
| 3,524,632 | A | * | 8/1970 | Davies ........................ 432/187 |
| 4,048,473 | A | * | 9/1977 | Burkhart ..................... 219/389 |
| 4,471,195 | A | * | 9/1984 | Ishii et al. ................... 219/752 |
| 4,860,461 | A | * | 8/1989 | Tamaki et al. ................... 34/68 |
| 5,492,055 | A | * | 2/1996 | Nevin et al. .................... 99/331 |
| 5,970,209 | A | * | 10/1999 | Toyokura .................... 392/307 |
| 6,036,988 | A | * | 3/2000 | Lemme et al. ............... 426/466 |
| 6,146,677 | A | * | 11/2000 | Moreth ....................... 426/505 |
| 6,518,553 | B1 | * | 2/2003 | Leykin et al. ............... 219/679 |
| 6,647,866 | B1 | * | 11/2003 | Chih .......................... 99/348 |

FOREIGN PATENT DOCUMENTS

JP 2001231528 A * 8/2001

OTHER PUBLICATIONS

JP 2001231528 machine translation.*

* cited by examiner

*Primary Examiner*—Drew E Becker
*Assistant Examiner*—Steven Leff
(74) *Attorney, Agent, or Firm*—Saliwanchik, Lloyd & Saliwanchik

(57) ABSTRACT

A coffee bean roaster and a method for roasting coffee beans using the roaster are disclosed. The coffee bean roaster includes an oven having a ceramic heating plate with a gate, and a rotary sliding unit to enter the gate so as to slide into the ceramic heating plate, so that the rotary sliding unit roasts coffee beans while rolling the coffee beans and spacing the coffee beans from both the ceramic heating plate and a burner. The method for roasting coffee beans using the coffee bean roaster includes entering the rotary sliding unit containing the coffee beans into the oven through the gate so as to place the rotary sliding unit in the oven at a position spaced apart from both the ceramic heating plate and the burner, roasting the coffee beans by far-infrared radiant heat emitted from the ceramic heating plate, and reburning combustion gases, generated from the roasting of the coffee beans, by the burner.

7 Claims, 6 Drawing Sheets

COFFEE BEAN ROASTER AND METHOD FOR ROASTING COFFEE BEANS USING THE SAME

BACKGROUND OF THE INVENTION

1. Field of the Invention

The present invention relates, in general, to coffee bean roasters and methods for roasting coffee beans using the same and, more particularly, to a coffee bean roaster and a method for roasting coffee beans using the same in which green coffee beans are roasted by far-infrared radiant heat emitted from a ceramic heating plate while combustion gases generated from the roasting of the coffee beans are reburnt by a burner.

2. Description of the Related Art

Generally, a conventional method for producing coffee from green coffee beans comprises: roasting the green coffee beans; blending desired additives, such as perfumery, with the roasted coffee beans when desired; and grinding or crushing the roasted blended coffee beans to manufacture roasted ground or crushed coffee beans which are put on the market. To take coffee as a beverage, the roasted ground or crushed coffee beans are infused in hot steam of boiled water.

In the above-mentioned method for producing coffee, the roasting of the green coffee beans which is the initial process of the method means that the green coffee beans are heated and roasted until the color of the coffee beans changes from light chocolate brown into dark brown-black. Further, the roasting grades of the coffee beans may be classified into several grades from light roasting to dark roasting according to the extent of the roasting executed after the coffee beans are dewatered during the roasting process.

The roasted coffee beans have a flavor, such as a sour flavor, a bitter flavor or a sweet flavor. However, the green coffee beans do not have any flavor expected from the roasted coffee beans, but have only the smell of greens.

Thus, the roasting of the coffee beans means a process in which the green coffee beans are heated to cause a chemical change therein, resulting in generation of ingredients causing the flavor in the coffee beans. In other words, the roasting of the coffee beans causes the coffee beans to exhibit their properties and thereby enhance their taste and aroma. Therefore, the roasting of the coffee beans has become recognized as the most important process in the method for processing the coffee beans.

Conventional methods for roasting green coffee beans include a hot-air method, a half-hot-air method and a direct-fired method.

In the hot-air method, a burner chamber is provided to directly blow hot air at a controlled temperature into a rotary drum, thus using the hot air to roast green coffee beans contained in the rotary drum. In the half-hot-air method, hot air from a burner chamber is guided to a part of a rotary drum through a hot air guide pipe, thus indirectly roasting green coffee beans contained in the rotary drum while preventing the coffee beans from being directly affected by the flame of the burner chamber. In the direct-fired method, green coffee beans are contained in a rotary drum with a net structure, while the flame from a burner placed under the rotary drum reaches the rotary drum to directly roast the coffee beans.

However, the conventional coffee bean roasting methods which are executed using hot air or direct fire inevitably generate combustion gases from the burning of the coffee bean skins to cause bad coffee smells. Thus, the conventional coffee bean roasting methods must need smokestacks that are installed around coffee bean roasters to discharge the combustion gases from the roasters to the atmosphere. However, the smokestacks increase the space taken up by the coffee bean roasters. If the coffee bean roasters operate without the smokestacks, the combustion gases generated from the roasting of the coffee beans soak into the coffee beans, reducing the taste and aroma of the coffee.

SUMMARY OF THE INVENTION

Accordingly, the present invention has been made keeping in mind the above problems occurring in the related art, and an aspect of the present invention is to provide a coffee bean roaster which prevents combustion gases, generated from the roasting of coffee beans, from soaking into the coffee beans, thus enhancing the taste and aroma of the coffee.

Another aspect of the present invention is to provide a coffee bean roaster which does not need a smokestack, thus reducing the space taken up by the coffee bean roaster.

A further aspect of the present invention is to provide a method for roasting coffee beans which enhances the taste and aroma of the coffee.

According to one aspect of the present invention, there is provided a coffee bean roaster, comprising: an oven comprising: a ceramic heating plate housed in a casing, with a gate provided on a side of the ceramic heating plate; a burner provided inside the ceramic heating plate to execute combustion of gas; and a temperature control unit to control a temperature of the oven; and a rotary sliding unit to enter the gate so as to slide into the ceramic heating plate, the rotary sliding unit roasting coffee beans while rolling the coffee beans and spacing the coffee beans from both the ceramic heating plate and the burner.

According to another aspect of the present invention, there is provided a method for roasting coffee beans using the coffee bean roaster, comprising: heating the ceramic heating plate; entering the rotary sliding unit containing the coffee beans into the oven through the gate so as to place the rotary sliding unit in the oven at a position spaced apart from both the ceramic heating plate and the burner; roasting the coffee beans by far-infrared radiant heat emitted from the ceramic heating plate while rotating the rotary sliding unit; and reburning combustion gases, generated from the roasting of the coffee beans, by the burner.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

A preferred embodiment of the present invention will be described herein below with reference to the accompanying drawings.

Figure 1:
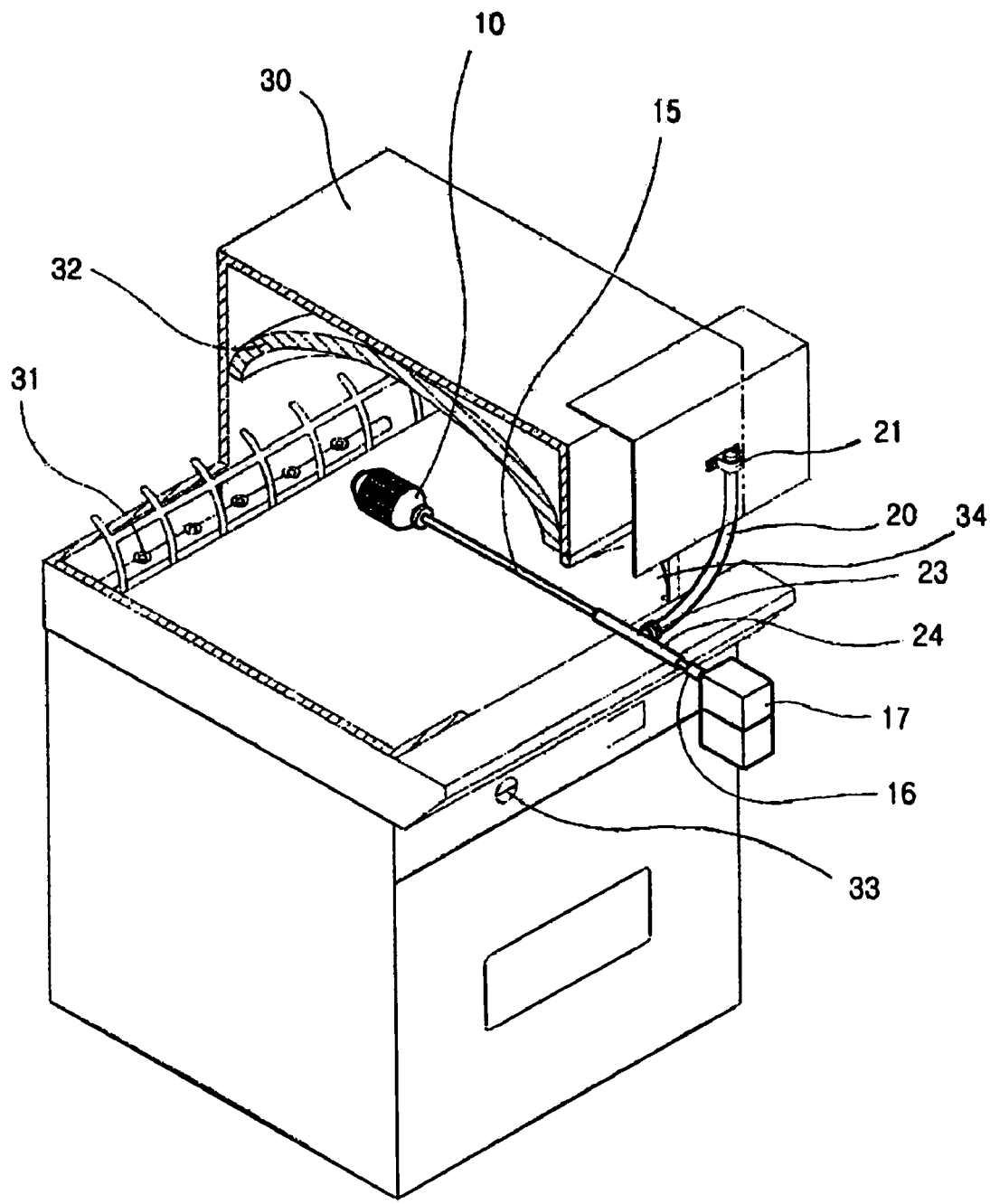
FIG. 1 is a perspective view of a coffee bean roaster according to an embodiment of the present invention, in which a part of the roaster is sectioned.

FIG. 1 is a perspective view of a coffee bean roaster according to an embodiment of the present invention, in which a part of the roaster is sectioned. As shown in FIG. 1, the coffee bean roaster according to the present invention comprises an outer casing, with an oven 30 housed in the casing.

The oven 30 comprises a ceramic heating plate 32 having a dome-shaped structure of a constant thickness, and a gate 34 formed on a front surface of the oven 30. Furthermore, a burner 31 is installed in the oven 30 at a position opposite the gate 34 to execute combustion of gas, while a temperature control unit 33 is provided on an outer surface of the oven 30 to control the temperature of the oven 30.

When a material is heated by the ceramic heating plate 32 of the oven 30 to a predetermined temperature, the heated material emits all the received heat energy to the outside. Further, as the ceramic heating plate 32 is heated by heat generated from the combustion of gas in the oven 30, the ceramic heating plate 32 emits far-infrared radiant heat. The far-infrared radiant heat can be easily absorbed by materials. Thus, if food is roasted, broiled or baked by the ceramic heating plate 32, the far-infrared radiant heat is evenly transferred to the outer part and the inner part of the food, thus evenly cooking all of the food and making the food taste good.

Thus, when roasting green coffee beans while applying the above-mentioned theory to the roasting, it is possible to produce coffee beans having taste and aroma better than those of coffee beans roasted through the conventional hot-air method or the conventional direct-fired method.

In the meantime, combustion gases generated from the roasting of the coffee beans, which may reduce the taste and aroma of the coffee beans, are reburnt by the flame of the burner which executes the combustion of gas. Thus, the coffee bean roaster of the present invention, unlike conventional roasters, does not need any smokestack, so that the roaster of the present invention reduces the space required for installation.

Unlike other food, the coffee beans must be rolled to be evenly roasted during the roasting, and thus a means for rolling the coffee beans during the roasting is provided in the roaster of the present invention. The rolling means comprises a rotary sliding unit 1 in the embodiment of the present invention.

Figure 2:
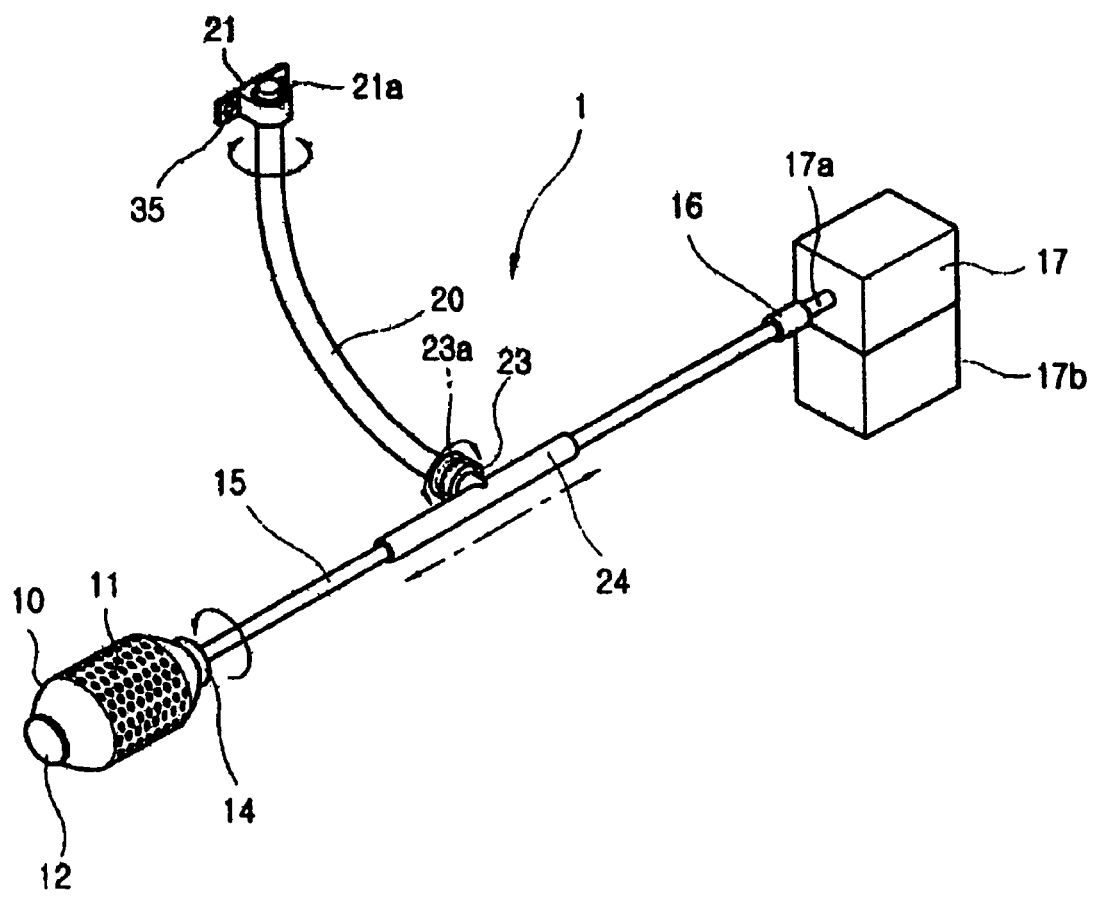
FIG. 2 is a perspective view of a rotary sliding unit included in the coffee bean roaster of FIG. 1.
Figure 3:
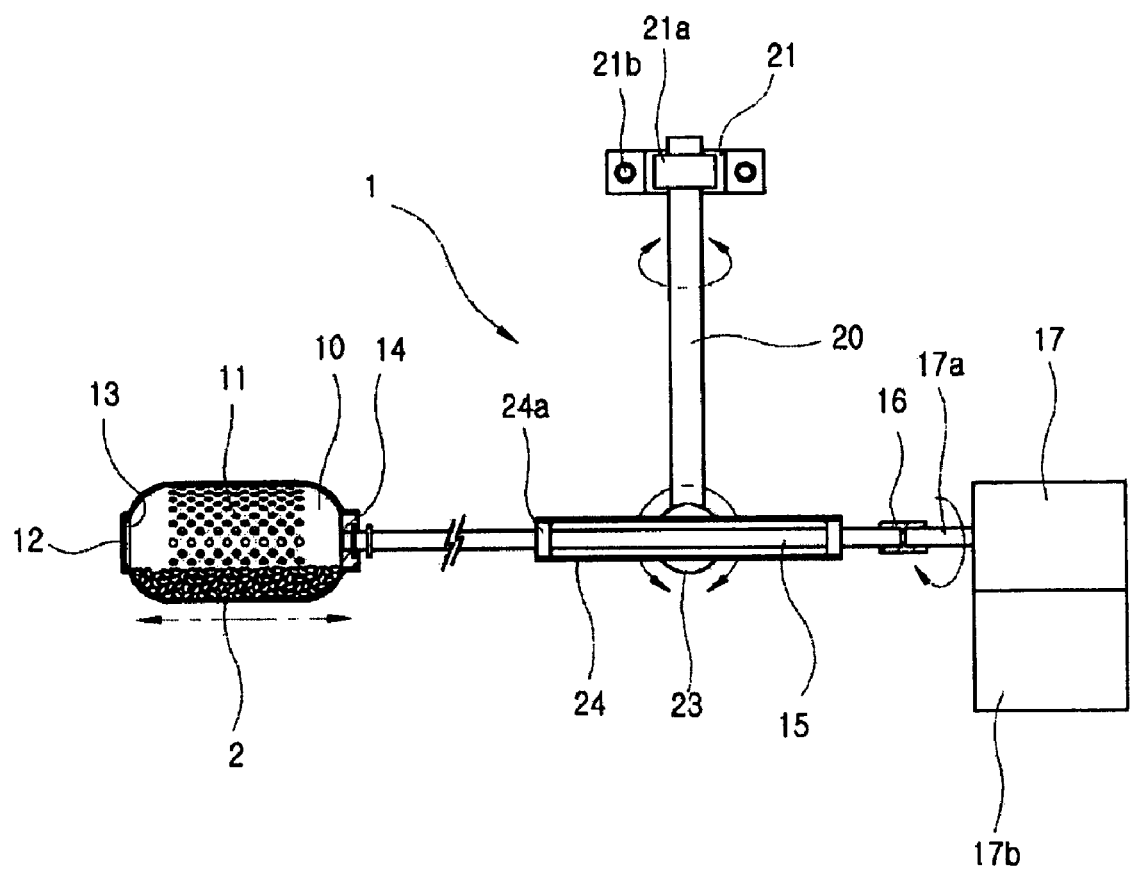
FIG. 3 is a front view of the rotary sliding unit of FIG. 2, in which a part of the rotary sliding unit is sectioned.

The construction of the rotary sliding unit 1 according to the embodiment of the present invention is shown in FIGS. 2 and 3.

As shown in FIGS. 2 and 3, the rotary sliding unit 1 is constructed to easily enter the gate 34 of the casing surrounding the oven 30, and to easily put and take the coffee beans 2 into and out of the oven 30, and to roll the coffee beans 2 during the roasting.

The rotary sliding unit 1 comprises a roasting container 10 which has a cylindrical shape, with an inlet 13 formed on a first end of the container 10 to introduce the coffee beans 2 into the container 10. A fitting hole 14 is formed on a second end of the container 10 to be coupled to an end of a rotating rod 15 therein. The container 10 further includes a cap 12 which closes the inlet 13. The sidewall of the container 10 is perforated to have a plurality of air holes 11 having a size smaller than the sizes of the coffee beans 2.

The rotating rod 15 longitudinally passes through a sliding guide 24, with a first end of the rod 15 coupled to the fitting hole 14 of the roasting container 10 and a second end of the rod 15 coupled to a joint 16.

The joint 16 is provided between the second end of the rotating rod 15 and an output shaft 17a of a motor 17 to couple the rod 17 to the output shaft 17a.

The motor 17 which constitutes a motor unit is electrically connected to a control device 17b which has a function of controlling the rotating speed and operating time of the motor 17 as well as an alarm function. The output shaft 17a of the motor 17 is fitted into the joint 16 to be coupled to the rotating rod 15.

The sliding guide 24 is a tubular body through which the rotating rod 15 passes, with a rod bearing 24a provided at each end of the sliding guide 24 to allow the rotating rod 15 to smoothly rotate and slide relative to the sliding guide 24. In the present invention, the rotary sliding unit 1 may further include a rod holding means for holding the rotating rod 15 on the casing.

A rotary unit 23 is provided on an outer surface of an intermediate portion of the sliding guide 24, with a first end of the rotary unit 23 mounted to the sliding guide 24 and a second end of the unit 23 coupled to an L-shaped rotary arm 20. To cause rotation of the sliding guide 24 relative to the rotary unit 23, a slider bearing 23a is provided in the rotary unit 23. In the present invention, the rotary sliding unit 1 may further include a guide holding means for holding the sliding guide 24 on the casing.

The L-shaped rotary arm 20 is coupled to the rotary unit 23 at a first end thereof, and is coupled to a locking unit 21 at a second end thereof.

The locking unit 21 comprises a locking bracket provided with bolt holes 21b to be mounted, using locking bolts 35, to the front surface of the casing surrounding the oven 30 of the roaster, which has the gate 34. An arm bearing 21a is provided in the locking unit 21 to rotatably support the second end of the rotary arm 20 in the locking unit 21. In the present invention, the rotary sliding unit 1 may further include an arm holding means for holding the rotary arm 20 on the casing.

The rod holding means, the guide holding mean and the arm holding means may be easily designed from conventional means by those skilled in the related art and the means is thus not illustrated in the accompanying drawings.

Furthermore, the control device 17b, the rod bearing 24a, the slider bearing 23a and the arm bearing 21a may be variously modified in their constructions to execute their functions without being limited to the illustrated constructions.

Figure 4A:
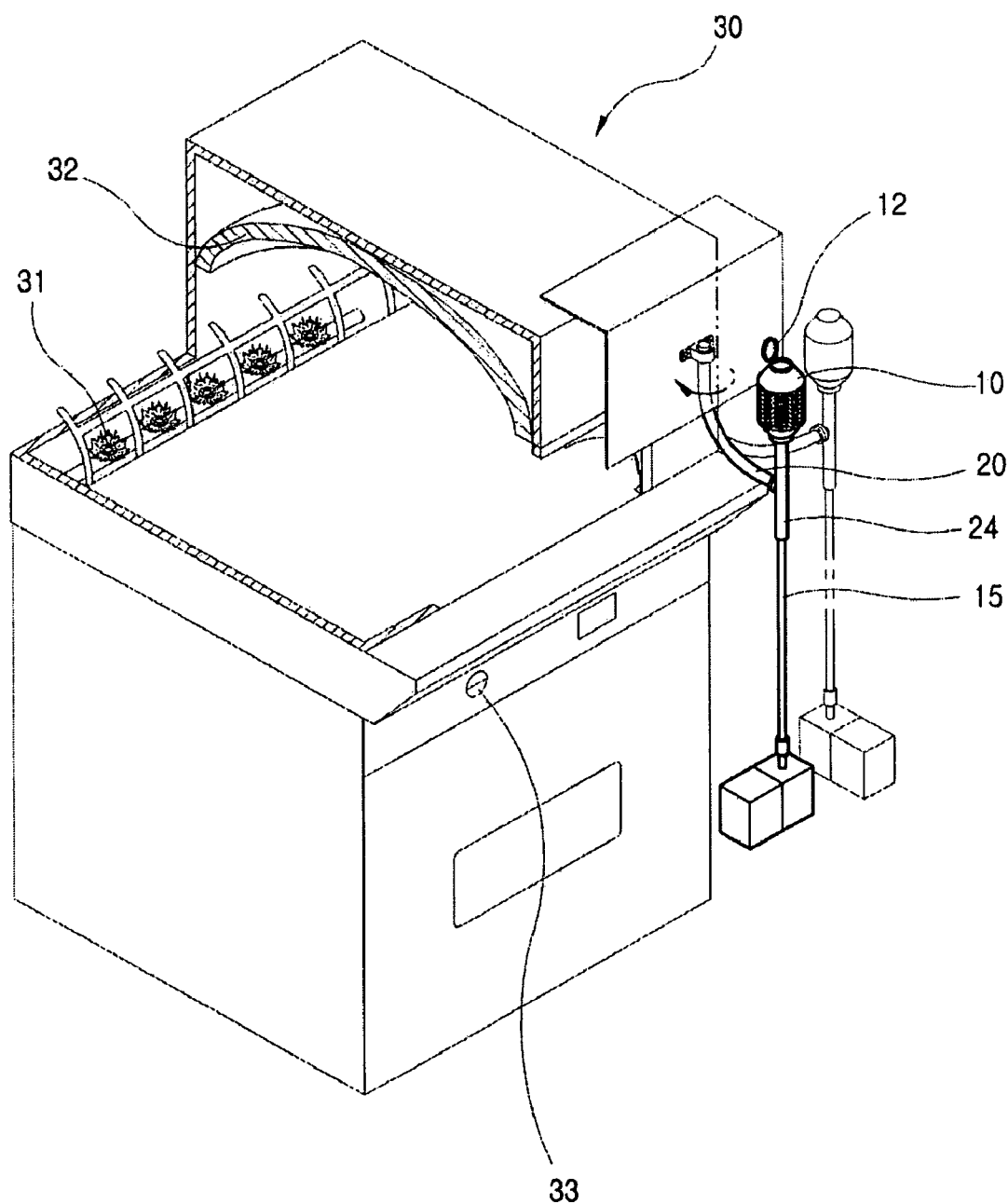
FIGS. 4a through 4c are views corresponding to FIG. 1, but showing operation of the coffee bean roaster of the present invention.
Figure 4B:
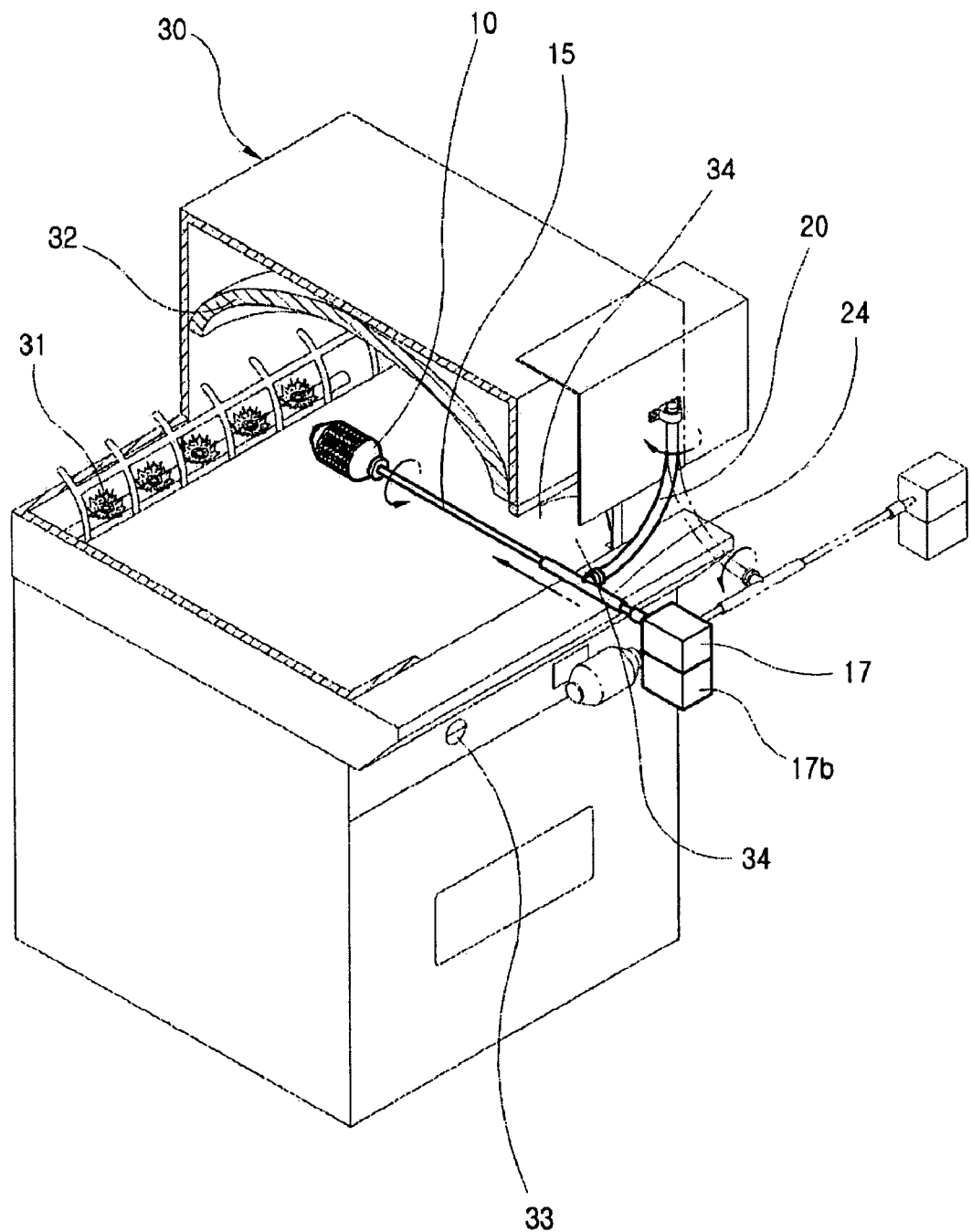
Figure 4C:
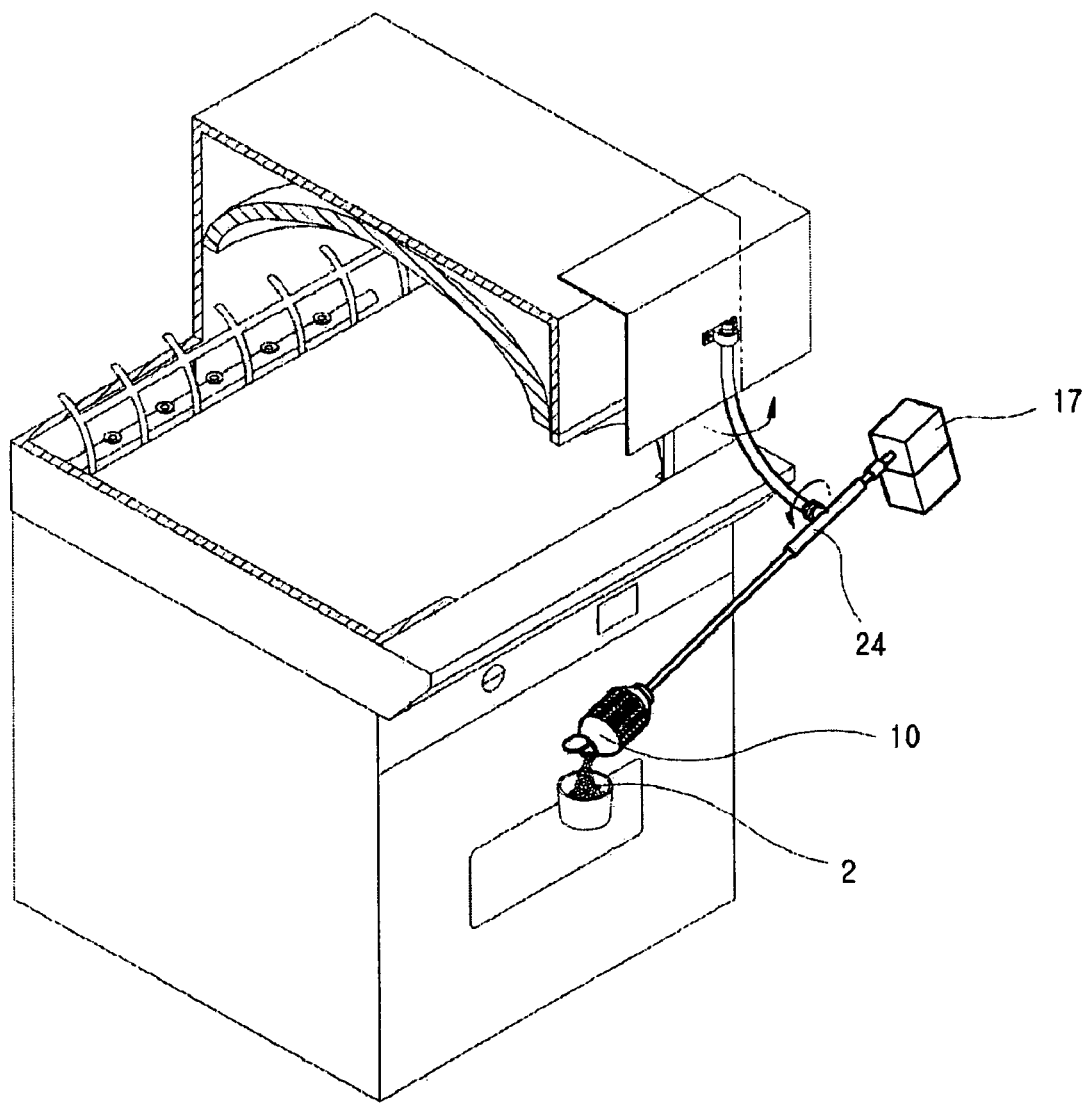

Herein below, a method for roasting coffee beans using the above-mentioned coffee bean roaster will be described in detail. FIGS. 4a through 4c are perspective views of the coffee bean roaster according to the embodiment of the present invention, in which a part of the roaster is sectioned to show operation of the coffee bean roaster during the roasting of the coffee beans.

First, the burner 31 of the oven 30 is ignited to burn gas, thus generating flame to heat the ceramic heating plate 32 installed in the oven 30. In that case, the inner temperature of the oven is controlled by the temperature control unit 33 to be maintained at a predetermined constant temperature. In the present invention, the predetermined constant inner temperature of the oven 30 is preferably set to 200° C. ~220° C. at which the coffee beans are appropriately roasted to provide the best flavor.

When the ceramic heating plate 32 is completely preheated, the rotary arm 20 rotates forwards. Thereafter, the cap 12 of the roasting container 10 is opened to receive a predetermined amount of coffee beans 2 into the container 10, prior to closing the cap 12. After closing the cap 12, the sliding guide 24 rotates to place the rotating arm 15 at a position parallel to a support surface on which the coffee bean roaster is installed.

Thereafter, the rotary arm 20 rotates so that the roasting container 10 is placed toward the gate 34 of the ceramic heating plate 32 and, thereafter, the rotating rod 15 passing through the sliding guide 24 is pushed into the oven 30 through the gate 34 as shown in FIG. 4b. Thus, the container 10 is placed in the oven 30.

The motor 17 operates at a predetermined rotating speed for a predetermined time under the control of the control device 17b. In that case, the operation of the motor 17 may be started by a start switch (not shown) provided on an appropriate position of the roaster or a contact switch (not shown) provided on the joint 16.

As the motor 17 operates as described above, the container 10 rotates to evenly heat the coffee beans 2 contained in the container by far-infrared radiant heat emitted from the ceramic heating plate 32. During the roasting of the coffee beans, the skins of the coffee beans are burnt to generate combustion gases which may cause bad coffee smells. However, in the coffee bean roaster of the present invention, the combustion gases are reburnt by the flame of the burner 31 which executes the combustion of gas.

In other words, as the coffee bean roasting method according to the present invention roasts the coffee beans using far-infrared radiant heat in place of hot air or direct fire used in conventional methods, the roaster of the present invention roasts the outer parts and the inner parts of the coffee beans 2 evenly, unlike conventional methods. Furthermore, the roasting method of the present invention reburns the combustion gases, generated from the roasting of the coffee beans 2, by the flame of the burner 31, so that the roasting method does not need any smokestack.

When the coffee beans 2 are completely roasted, the operation of the motor 17 is stopped and, thereafter, the container 10 is taken out of the oven 30. After taking the container 10 out of the oven 30, the sliding guide 24 rotates so that the container 10 is directed downwards as shown in FIG. 4c. The cap 12 is opened to discharge the roasted coffee beans 2 from the container 10 to the outside.

Although a preferred embodiment of the present invention has been described for illustrative purposes, those skilled in the art will appreciate that various modifications, additions and substitutions are possible, without departing from the scope and spirit of the invention as disclosed in the accompanying claims.

As apparent from the above description, the present invention provides a coffee bean roaster and a method for roasting coffee beans using the roaster. In the coffee bean roaster and the roasting method of the present invention, coffee beans are roasted by far-infrared radiant heat generated from a ceramic heating plate while being rolled in a container spaced apart from both the ceramic heating plate and a burner. The coffee beans are thus roasted evenly unlike conventional roasting methods, so that the roaster and the roasting method produce the roasted coffee beans having excellent taste and aroma. During the roasting of the coffee beans, combustion gases generated from the roasting and causing bad coffee smells are reburnt by the flame of the burner which executes the combustion of gas, so that the roaster and the roasting method of the present invention prevent the combustion gases from soaking into the coffee beans, thus enhancing the taste and aroma of the coffee. Furthermore, the coffee bean roaster and roasting method does not need a smokestack, thus reducing the space taken up by the roaster.

What is claimed is:

1. A coffee bean roaster, comprising:
   an oven
   a ceramic heating plate housed in the oven;
   a gate provided on the oven;
   a burner provided inside the oven to execute combustion of gas; and
   a temperature control unit to control a temperature of the oven; and
   a rotary sliding unit to enter the gate so as to slide into the oven, the rotary sliding unit roasting coffee beans while rolling the coffee beans and spacing the coffee beans from both the ceramic heating plate and the burner.

2. The coffee bean roaster according to claim 1, wherein the rotary sliding unit comprises:
   a roasting container, with an inlet formed on a first end of the roasting container to introduce the coffee beans into the roasting container and a fitting hole formed on a second end of the roasting container;
   a rotating rod coupled to the fitting hole at a first end thereof;
   a motor unit coupled to a second end of the rotating rod;
   a hollow sliding guide through which the rotating rod longitudinally passes, with a rotary unit having a slider bearing provided on an outer surface of the sliding guide;
   an L-shaped rotary arm coupled to the rotary unit at a first end thereof; and
   a locking unit mounted to the casing, with an arm bearing provided in the locking unit to rotatably couple a second end of the L-shaped rotary arm to the locking unit.

3. The coffee bean roaster according to claim 2, wherein the roasting container comprises a plurality of air holes having a size smaller than sizes of the coffee beans.

4. The coffee bean roaster according to claim 2, wherein the motor unit comprises:
   a motor;
   a control device to control a rotating speed and an operating time of the motor;
   an output shaft provided on the motor; and
   a joint for coupling the output shaft of the motor to the rotating rod.

5. The coffee bean roaster according to claim 2, further comprising:
   a rod bearing provided at each end of the sliding guide.

6. The coffee bean roaster of claim 1, wherein the burner is provided below the ceramic heating plate and at a position opposite the gate.

7. The coffee bean roaster of claim 1, wherein the ceramic heating plate is dome-shaped.

* * * * *